US007312253B2

(12) United States Patent
Handa et al.

(10) Patent No.: US 7,312,253 B2
(45) Date of Patent: Dec. 25, 2007

(54) INSULATING THERMOPLASTIC FOAMS MADE WITH METHYL FORMATE-BASED BLOWING AGENTS

(75) Inventors: Yash Paul Handa, Pittsford, NY (US); Joseph A. Brackman, North Benton, OH (US); Glenn C. Castner, Victor, NY (US); Mohammad Zafar, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/016,312

(22) Filed: Dec. 17, 2004

(65) Prior Publication Data

US 2006/0047009 A1    Mar. 2, 2006

Related U.S. Application Data

(63) Continuation-in-part of application No. 10/934,832, filed on Sep. 3, 2004.

(51) Int. Cl.
C08J 9/00 (2006.01)
(52) U.S. Cl. .......................... 521/79; 521/98; 521/142; 521/146
(58) Field of Classification Search ................. 521/98, 521/79, 142, 246
See application file for complete search history.

(56) References Cited

U.S. PATENT DOCUMENTS

| | | | |
|---|---|---|---|
| 2,816,827 A | 12/1957 | Roth | |
| 2,861,898 A | 11/1958 | Platzer | |
| 2,911,382 A | 11/1959 | Barkhuff | |
| 2,983,962 A | 5/1961 | Merz | |
| 3,085,073 A | 4/1963 | Lintner | |
| 3,089,857 A | 5/1963 | Pottenger | |
| 3,379,799 A | 4/1968 | Goldman | |
| 3,577,360 A | 5/1971 | Immel | |
| 3,759,641 A | 9/1973 | Immel | |
| 3,855,377 A | 12/1974 | Uebelhart | |
| 3,864,444 A | 2/1975 | Johnson | |
| 3,900,433 A | 8/1975 | Taub et al. ................... 260/2.5 |
| 3,914,191 A * | 10/1975 | Scott .......................... 521/97 |
| 3,929,686 A * | 12/1975 | Stevenson ..................... 521/89 |
| 3,962,154 A | 6/1976 | Egli | |
| 4,009,976 A | 3/1977 | Johnson | |
| 4,033,910 A | 7/1977 | Papa ........................... 260/2.5 |
| 4,042,658 A | 8/1977 | Collins | |
| 4,098,941 A | 7/1978 | Johnson ....................... 428/218 |
| 4,104,440 A | 8/1978 | Collins | |
| 4,272,469 A | 6/1981 | Smith | |
| 4,323,528 A | 4/1982 | Collins ........................ 264/53 |
| 4,557,881 A | 12/1985 | Rabotski .................... 264/40.4 |
| 4,695,595 A | 9/1987 | Blount ......................... 521/99 |
| 4,769,396 A | 9/1988 | Blount ......................... 521/114 |
| 4,960,804 A | 10/1990 | Doerge ......................... 521/130 |
| 4,997,858 A | 3/1991 | Jourquin et al. .............. 521/118 |
| 5,064,872 A | 11/1991 | Monstrey et al. ............ 521/131 |
| 5,149,473 A | 9/1992 | LeDuc .......................... 264/51 |
| 5,166,182 A | 11/1992 | Blanpied ....................... 521/50 |
| 5,227,408 A | 7/1993 | Hanna et al. ................. 521/130 |
| 5,242,494 A | 9/1993 | Callaghan et al. ........... 106/603 |
| 5,283,003 A | 2/1994 | Chen ........................... 252/350 |
| 5,336,696 A | 8/1994 | Ashida ......................... 521/113 |
| 5,439,947 A | 8/1995 | Bartlett et al. ............... 521/131 |
| 5,478,494 A | 12/1995 | Lee et al. .............. 525/182.25 |
| 5,532,284 A | 7/1996 | Bartlett et al. ............... 521/134 |
| 5,563,180 A | 10/1996 | Skowronski et al. ........ 521/125 |
| 5,786,401 A | 7/1998 | Inagaki et al. ............... 521/128 |
| 5,912,279 A | 6/1999 | Hammel et al. ............. 521/146 |
| 5,922,348 A | 7/1999 | Wegner ....................... 424/443 |
| 5,965,231 A | 10/1999 | Rotermund et al. ........... 428/69 |
| 6,136,875 A | 10/2000 | Wu et al. ...................... 521/97 |
| 6,315,932 B1 | 11/2001 | Fujiwara et al. ............... 264/53 |
| 6,355,341 B1 | 3/2002 | Chaudhary et al. ....... 428/314.8 |
| 6,355,701 B1 | 3/2002 | Soukup et al. ............... 521/117 |
| 6,526,764 B1 | 3/2003 | Singh et al. .................... 62/84 |
| 6,569,912 B1 | 5/2003 | Oohara et al. ................. 521/79 |
| 6,599,946 B2 | 7/2003 | Duffy et al. ................... 516/12 |
| 6,696,504 B1 | 2/2004 | Hayashi et al. ............... 521/79 |
| 6,753,357 B2 | 6/2004 | Kalinowski et al. ........ 521/13.4 |
| 6,762,212 B2 | 7/2004 | Oohara et al. ............... 521/146 |
| 6,841,581 B2 | 1/2005 | Hayashi et al. ............... 521/79 |

(Continued)

FOREIGN PATENT DOCUMENTS

WO    WO 91/13966 A1    9/1991
WO    WO 2004/005382 A1    1/2004

OTHER PUBLICATIONS

Cellular Materials, Encyclopedia of Polymer Science and Technology, J. Wiley and Sons, Article online, copyright 1999-2005.*

Primary Examiner—Irina S Zemel
(74) Attorney, Agent, or Firm—Baker Botts L.L.P.

(57) ABSTRACT

A blowing agent blend for making thermoplastic polymer foams comprises methyl formate. The blowing agent blend can further comprise at least one co-blowing agent. The co-blowing agent is either a physical co-blowing agent (e.g. an inorganic agent, a hydrocarbon, a halogenated hydrocarbon, a hydrocarbon with polar, functional group(s), water or any combination thereof), or a chemical co-blowing agent, or combinations thereof. The thermoplastic polymer foam can be an alkenyl aromatic polymer foam, e.g. a polystyrene foam. The blowing agent blend can comprise any combination of methyl formate and one or more co-blowing agents. The methyl formate-based blowing agent blends produce stable foams for various applications, including containers, packaging systems, as well as insulation boards and building materials. A process for the preparation of such foams is also provided.

65 Claims, 2 Drawing Sheets

U.S. PATENT DOCUMENTS

| | | | |
|---|---|---|---|
| 2002/0198273 A1 | 12/2002 | Nyberg et al. | 521/98 |
| 2003/0078312 A1 | 4/2003 | Hibino et al. | 521/155 |
| 2003/0114549 A1 | 6/2003 | Kalinowski et al. | 521/99 |
| 2004/0006149 A1 | 1/2004 | Handa et al. | 521/79 |
| 2004/0024077 A1 | 2/2004 | Braun et al. | 521/155 |
| 2004/0132844 A1 | 7/2004 | Francis et al. | 521/79 |
| 2005/0131094 A1 | 6/2005 | Kalinowski et al. | 521/155 |

* cited by examiner

INSULATING THERMOPLASTIC FOAMS MADE WITH METHYL FORMATE-BASED BLOWING AGENTS

CROSS REFERENCE TO RELATED APPLICATIONS

This application is a continuation-in-part of U.S. application Ser. No. 10/934,832, filed Sep. 3, 2004, the content of which is expressly incorporated herein by reference thereto.

FIELD OF INVENTION

The present invention relates generally to foams using blowing agent blends or mixtures, and processes of making the same. Particularly, the present invention relates to thermoplastic polymer foams using methyl formate-based blowing agent blends that produce stable foams, and processes of making the same. The thermoplastic polymer foams are particularly suitable for insulation applications, such as insulation boards in building materials and the like.

BACKGROUND OF THE INVENTION

Thermoplastic foams made from alkenyl aromatic polymers (e.g., polystyrene) or polyolefin polymers (e.g. polyethylene) have found extensive use, particularly as insulating materials. Generally, insulating foams are produced in thicknesses greater than about one-half inch. The insulating value of such foams is measured in terms of heat conduction resistance or R-value, per one inch of foam thickness. Adequate insulating foams typically have R-values of about 4.0 per inch or greater. It is also desirable for such insulating foams to be dimensionally stable.

These and other polymer foams are commonly made by using a blowing agent with molten resin under pressure and, after thorough mixing, extruding the combination through an appropriate die into a lower pressure atmosphere.

In the past, physical blowing agents widely used for making foams were chlorofluorocarbons, which, because of their high ozone depletion potential (ODP), were subsequently replaced with hydrochlorofluorocarbons (HCFCs). The use of HCFC blowing agents, however, will likely be banned in the near term, again because of high ODP. Some of these blowing agents can be replaced with hydrofluorocarbons (HFCs), which have zero ODP, so as to minimize damage to the ozone layer. Furthermore, HFCs have a thermal conductivity lower than most polymers or blowing agents, so HFC residuals in a polymeric foam can lower the foam's thermal conductivity.

Presently, physical blowing agents more commonly used for making thermoplastic polymer foams such as alkenyl aromatic polymer (e.g., polystyrene) or polyolefin polymer (e.g. polyethylene) foams, are hydrocarbons, chlorinated hydrocarbons, hydrochlorofluorocarbons, or combinations thereof. Hydrocarbons with three or more carbons atoms are considered volatile organic compounds (VOCs) that can lead to the formation of smog. Halogenated hydrocarbons often are either VOCs or have high ODP or are hazardous air pollutants (HAPs), and, at times, may fall into more than one of these categories. Therefore, the use of such blowing agents for preparing polymeric foams is not preferred environmentally and imposes many limitations on the manufacturing process, thus complicating and significantly increasing the cost of manufacturing.

Methyl formate is classified as a non-VOC (Federal Register, Volume 69, Number 228, Nov. 29, 2004), is non-HAP, and has zero ODP. U.S. Pat. No. 6,753,357 describes the use of methyl formate to produce stable, rigid isocyanate/polyol based polyurethane foams. It is noted, however, that such polyurethane foams are thermoset, so as to be made via a cross-linking and curing process. The dimensional stability or instability imparted to the final polyurethane foam product by the nature of the blowing agent therefore is quite different than in the case of melt processed thermoplastic polymer foams.

Therefore, a need exists for blowing agents employing methyl formate as one of the components of the blowing agent blend to produce stable thermoplastic foams without compromising the product quality in terms of appearance, mechanical or compressive strength and insulation value, and that enable a cost-effective and versatile manufacturing process.

SUMMARY OF THE INVENTION

According to one embodiment of the present invention, a preferred blowing agent blend for making insulating thermoplastic polymer foams comprises methyl formate. The blowing agent blend further comprises at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), a chemical co-blowing agent, or combinations thereof. The polymer foams are used for insulation applications, e.g., as insulation boards in building materials, and have R-values of about 4.0 per inch or greater. Generally the insulating foam boards have a thickness of at least about 0.5 inch, preferably about 0.5 inch to about 3 inches. In a preferred embodiment, the thermoplastic polymer foam is an alkenyl aromatic polymer foam. In a more preferred embodiment, the alkenyl aromatic polymer foam is a polystyrene foam. The blowing agent blend of the preferred embodiment preferably comprises 99 mol % or less methyl formate, and one or more co-blowing agents.

According to another embodiment, a thermoplastic polymer foam structure useful for insulation applications is prepared by a process comprising melting a thermoplastic polymer. An effective amount of a blowing agent blend is dissolved in the polymer melt to define a mixture. In a preferred embodiment, the blowing agent blend comprises methyl formate and at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), a chemical co-blowing agent, or combinations thereof. The polymer foam boards are used for insulation applications, e.g., as insulation boards in building materials, and have R-values of about 4.0 per inch or greater. Generally the insulating foams have a thickness of at least about 0.5 inch, preferably about 0.5 inch to about 3 inches. An extrudate is formed from the mixture, preferably using a flat die, and is expanded to produce the polymer foam structure. For example, and in accordance with a preferred embodiment of the present invention, the extrudate is initially transferred to an expansion zone and is permitted to expand in the expansion zone.

According to a process of the present invention, a thermoplastic polymer foam structure useful for insulation applications is produced by melting a thermoplastic polymer. An effective amount of a blowing agent blend is dissolved in the alkenyl aromatic polymer melt to define a mixture. In a preferred embodiment, the blowing agent blend comprises methyl formate and at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), or a chemical co-blowing agent, or combinations thereof. The polymer foams are used for insulation applications, e.g., as insulation boards in building materials, and have R-values of about 4.0 per inch or greater. Generally the insulating foams have a thickness of at least about 0.5 inch, preferably about 0.5 inch to about 3 inches. An extrudate is formed from the mixture, preferably using a flat die, and is expanded to produce the polymer foam structure. For example, and in accordance with a preferred embodiment of the present invention, the extrudate is initially transferred to an expansion zone and is permitted to expand in the expansion zone.

The polymer foam structure obtained by the process of the present invention preferably is a substantially closed-cell and dimensionally-stable structure. In a preferred embodiment, the alkenyl aromatic foam structure comprises a polystyrene polymer.

Figure 1:
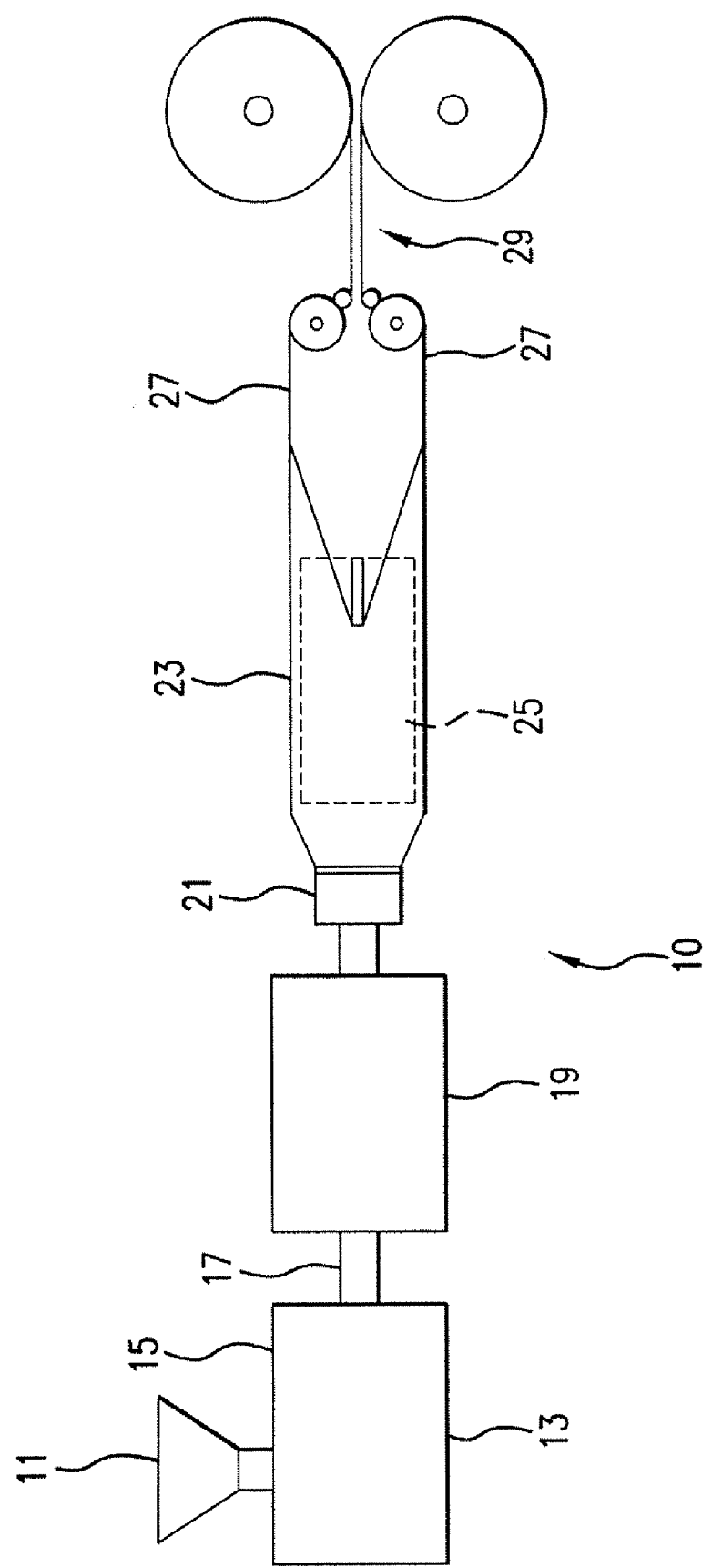
FIG. 1 is a schematic flow diagram of an overall sequence of operations involved in the manufacture of a foam sheet with the blowing agent blends according to one embodiment of the present invention.

While the invention is capable of various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

The effectiveness of a blowing agent depends on its solubility in the polymer melt and its ability to expand the polymer-blowing agent solution when such a solution is subjected to thermodynamic instability such as when the solution exits a die attached to an extruder (to provide the extrudate). The expansion of the extrudate depends on the difference between the glass transition temperature of the thermoplastic polymer $T_g$ and the boiling point of the blowing agent $T_b$. In general, the solubility of the blowing agent in the polymer melt depends on the difference between $T_g$ and $T_b$ ($T_g-T_b$); the smaller the difference the higher the solubility. Since volatility follows an inverse relationship with $T_b$, it also implies that at the same conditions of temperature and pressure, a higher volatility blowing agent will have lower solubility compared to a lower volatility blowing agent. It, therefore, suggests that by blending a lower volatility blowing agent with a higher volatility blowing agent, a foaming formulation with optimized solubility and expandability characteristics can be developed.

The foams and processes of the present invention employ a blowing agent blend or mixture to achieve a stable thermoplastic polymer foam. The preferred blowing agent blend used in the present invention includes methyl formate, which is non-VOC and non-HAP, and has zero ODP. Hence, eliminating HAPs and minimizing the propensity to smog formation from the manufacturing process and the foam resulting therefrom is not only environmentally friendly, but also avoids many of the disadvantages of currently employed blowing agent compositions and processes. Thus, a blend of methyl formate with one or more suitable blowing agents having similar environmental attributes and, additionally, low thermal conductivity can help offset the harmful environmental impacts (ODP, HAP, VOC) associated with the blowing agents in current use.

Resins that can be foamed in accordance with the present invention include melt processable thermoplastic polymers such as alkenyl aromatic polymers, polyolefins, polycarbonates, polyacrylates, and others. The term thermoplastic polymer includes both amorphous and semi-crystalline polymers. Examples of amorphous thermoplastic polymers include but are not limited to polystyrene, polycarbonate, poly(methyl methacrylate) and poly(phenylene oxide). Examples of semi-crystalline thermoplastic polymers include but are not limited to polyethylene, polypropylene, syndiotactic-polystyrene, poly(ethylene terephthalate).

A preferred embodiment of the present invention relates to alkenyl aromatic polymers. The term "alkenyl aromatic polymer" as used herein includes polymers of aromatic hydrocarbon molecules that contain an aryl group joined to an olefinic group with only double bonds in the linear structure, such as styrene, or styrene homologs such as α-methylstyrene, o-, m- and p-methylstyrene, α-ethylstyrene, o-, m-, p-ethylstyrene, 2,4-dimethylstyrene, α-vinylxylene, vinyl toluene and the like. Alkenyl aromatic polymers also include homopolymers of styrene or styrene homologs (commonly referred to as polystyrene), copolymers of styrene, and rubber-toughened polystyrene (commonly referred to as high impact polystyrene, HIPS). With respect to a styrene copolymer, the comonomer generally can be any other ethylenically unsaturated material such as the conjugated 1,3-dienes, e.g., butadiene, isoprene, etc., alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of a styrene polymer with other polymers can be employed, e.g., blends of a styrene polymer with polyphenylene oxide. Preferably, the copolymers contain a predominant portion of styrene, for example greater than about 50 wt % styrene, and more preferably greater than 75% styrene.

The composition of the blowing agent blend depends on the foamed structure being prepared. In one embodiment, when the foamed structure is a sheet, the blowing agent blend comprises from about 1% to about 100% methyl formate. In another embodiment, however, when the foamed structure is a sheet, an insulating board or plank, the blowing agent blend comprises from about 1% to about 99% methyl formate, and at least one co-blowing agent. It is contemplated that more than one co-blowing agent can be employed in the blowing agent blend. Such co-blowing agent(s) can be physical, chemical or combinations thereof. The co-blowing agent generally is fast expanding as compared to a pure methyl formate blowing agent. The co-blowing agent can be an organic compound or an inorganic compound. Some non-limiting examples of physical co-blowing agents include, but are not limited to, inorganic agents, organic agents (e.g. hydrocarbons, halogenated hydrocarbons, ethers, esters, acetals, alkanols, carbonates, amines and ketones), or any combination thereof.

Some suitable inorganic physical blowing agents include, but are not limited to, carbon dioxide, water, air, nitrogen, argon, xenon, sulfur hexafluoride, nitrous oxide, ammonia, silicon tetrafluoride, nitrogen trifluoride, boron trifluoride, and boron trichloride, or any combination thereof. In one currently preferred embodiment, the inorganic agent is an inorganic gas such as carbon dioxide, nitrogen, argon, air and the like. A currently preferred inorganic gas is carbon dioxide. In another currently preferred embodiment, the inorganic agent is water.

Some examples of organic physical co-blowing agents that can be used in the present invention include, but are not limited to, hydrocarbons, halogenated hydrocarbons, fluids with polar groups such as ethers, esters, acetals, carbonates, alkanols, amines and ketones, and combinations thereof. Examples of hydrocarbons include, but are not limited to, methane, ethane, propane, cyclopropane, normal- or iso-butane, cyclobutane, neopentane, isopentane, and cyclopentane or any combination thereof. Examples of currently preferred halogenated hydrocarbons include, but are not limited to, hydrofluorocarbons such as methyl fluoride, difluoromethane (HFC-32), trifluoromethane (HFC-23), perfluoromethane, ethyl fluoride, 1,2-difluoroethane (HFC-152), 1,1-difluoroethane (HFC-152a), 1,1,1-trifluoroethane (HFC-143a), 1,1,1,2-tetrafluoroethane (HFC-134a), pentafluoroethane (HFC-125), perfluoromethane, difluoropropane, 1,1,1-trifluoropropane, 1,1,1,3,3-pentafluoropropane (HFC-245fa), 1,1,1,2,3,3-hexafluoropropane (HFC-236ea), 1,1,1,2,3,3,3-heptafluoropropane (HFC-227ea), perfluoropropane, 2,2,4,4,4-pentafluoroethane (HFC-365mfc), perfluorobutane, perfluorocyclobutane, and vinyl fluoride, or any combination thereof. Fluids with polar groups include but are not limited to ethers such as dimethyl ether, vinyl methyl ether, methyl ethyl ether, dimethyl fluoroether, diethyl fluoroether, and perfluorotetrahydrofuran; amines such as dimethylamine, trimethylamine and ethylamine; ketones such as acetone and perfluoroacetone; esters such as ethyl formate and methyl acetate; acetals such as methylal; carbonates such as dimethyl carbonate; alkanols such as ethanol or any combination thereof. A currently preferred organic physical co-blowing agent is 1,1,1,2-tetrafluoroethane (HFC-134a).

If the use of hydrochlorocarbons and/or hydrochlorofluorocarbons is required or desired, a blend of methyl formate in combination with such co-blowing agents can at least help to offset the environmental impacts by reducing the amount of such harmful agents required. Examples of hydrochlorocarbons and hydrochlorofluorocarbons include, but are not limited to, chlorodifluoromethane (HCFC-22), methylene chloride, ethyl chloride, 1,1-dichloro-1-fluoroethane (HCFC-141b), 1-chloro 1,1-difluoroethane (HCFC 142b), 1,1-dichloro-2,2,2-trifluoroethane (HCFC-123), and 1-chloro-1,2,2,2-tetrafluoroethane (HCFC-124).

The boiling point of methyl formate is 32° C. In another preferred embodiment of the present invention as applied to alkenyl aromatic polymers, methyl formate is mixed with one or more physical co-blowing agent(s) with boiling point less than 32° C.

Chemical co-blowing agents are compounds which undergo a chemical reaction, for example decomposition to produce an inorganic gas such as $CO_2$ or $N_2$ and CO. Non-limiting examples of suitable chemical co-blowing agents include azodicarbonamide, azodiisobutyronitrile, benzenesulfonylhydrazide, 4,4'-oxybis(benzene sulfonylhydrazide), p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. There are also various acid/bicarbonate mixtures that decompose into gases when heated. For example, mixtures of citric acid and sodium bicarbonate sold under the name HYDROCEROL® can be employed as chemical co-blowing agents.

The total amount of the blowing agent blend used depends on conditions such as extrusion-process conditions at mixing, the chemical and thermophysical characteristics of the blowing agent blend being used, the composition of the extrudate, and the desired density and associated properties such as insulation value, weight to strength ratio, compressive strength, etc. of the foamed article. The extrudate is defined herein as including the blowing agent blend, polymer resin(s), and any additives. For a foam having a density of from about 1 to about 15 $lb/ft^3$, the extrudate typically comprises from about 18 to about 1 wt % of blowing agent.

The blowing agent blend used in the present invention comprises 100% methyl formate, or it can comprise 99% or less methyl formate. The blowing agent blend generally comprises from about 5 mol % to about 75 or 80 mol % methyl formate, for example from about 20 mol % to about 80 mol % methyl formate. The blowing agent blend more typically comprises from about 20 or 25 mol % to about 60 mol % methyl formate. More specifically, the blowing agent blend preferably comprises from about 20 or 25 mol % to about 50 mol % methyl formate.

If provided, the blowing agent blend generally comprises at least about 20 or 25 mol % of co-blowing agent(s). The blowing agent blend more typically comprises from about 80 or 75 mol % to about 40 mol % of co-blowing agent(s). More specifically, the blowing agent blend preferably comprises from about 80 or 75% to about 50 mol % of co-blowing agent(s).

A nucleating agent or combination of such agents can be employed in the present invention for advantages such as its capability for regulating cell formation and morphology. A nucleating agent, or cell size control agent, can be any conventional or useful nucleating agent(s). The amount of nucleating agent used depends upon the desired cell size, the selected blowing agent blend, and the desired foam density. The nucleating agent is generally added in amounts from about 0.02 to about 2.0 wt % of the polymer resin composition.

Some contemplated nucleating agents include inorganic materials (in small particulate form), such as clay, talc, silica, and diatomaceous earth. For example, talc can be used from about 0.25 to about 2.0 wt % of the polymer composition. Other examples of nucleating agents include organic nucleating agents that decompose or react at the heating temperature within an extruder to evolve gases, such as carbon dioxide and/or nitrogen. One example is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents can be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer). Talc can be added in a carrier or in a powder form.

If desired, fillers, colorants, light and heat stabilizers, anti-oxidants, acid scavengers, stability control agents, flame retardants, processing aids, extrusion aids and foaming additives can be used in making the foam.

Any of the variety of suitable extrusion system and methods known in the art can be used in accordance with the present invention. One example of a suitable system and method includes, for example, a conventional two-extruder tandem system with each extruder having a single screw. Alternatively, a two-extruder tandem system in which the primary extruder is a twin screw, and the secondary extruder is a single screw can be used for extruding the foam article of the present invention. A single extruder with proper cooling can also be employed in the present invention.

According to one process of the present invention, thermoplastic polymer pellets (e.g., polystyrene) are admixed with a nucleating agent, such as talc. These materials are continuously fed into a hopper of an extruder. The feed mixture is conveyed forward by a screw within a barrel of the extruder as the mixture is mixed, compressed, heated, and converted to molten form. The conversion to molten form occurs prior to reaching an injection zone where the blowing agent is added. The blowing agent blend of the present invention can be injected into the polymer composition at a point where the polymer is in a melt state (i.e., beyond the feed zone). Each of the components of the blowing agent blend can be individually injected, either sequentially or simultaneously and in any order, into the polymer mixture. Alternatively, the components of the blowing agent blend can be pre-mixed and the mixture injected into the polymer composition. If a two-extruder tandem system is used, the blowing agent blend can be injected either in the primary or the secondary extruder or some components of the blend can be injected in the primary extruder and the remaining components in the secondary extruder.

After injecting the blowing agent blend, the mixture is continuously mixed at pressures to ensure a homogeneous solution of the resin and the blowing agent blend. The molten mixture is then conveyed into a cooling zone where additional mixing takes place. After cooling, the mixture is extruded into a holding zone maintained at a temperature and pressure that prevents or inhibits foaming of the mixture. The holding zone has (a) an outlet die having an orifice opening into a zone of lower pressure such as atmospheric pressure at which the mixture foams, (b) means for closing the orifice without disturbing the foamable mixture within the holding zone, and (c) opening means for allowing the foamable mixture to be ejected from the holding zone. An example of a holding zone is described in U.S. Pat. No. 4,323,528, the contents of which are incorporated by reference herein. Regardless of whether a holding zone is used, the mixture is then extruded through a die into a lower pressure zone, such as atmospheric pressure.

According to one embodiment as applied to alkenyl aromatic polymers such as polystyrene, a two-extruder tandem system 10 depicted in FIG. 1 can be used for extruding a foam article (e.g., a sheet) of the present invention. Polymer resin pellets are mixed with one or more additives (e.g., a nucleating agent) to form a feed mixture which is fed continuously into a hopper 11 of a primary extruder 13. The feed mixture is conveyed forward by a helical screw within a barrel of the extruder as the feed mixture is mixed, compressed, heated and melted prior to reaching the blowing agent-injection zone. The blowing agent is added at point 15. Thus, the blowing agent of the present invention is injected into the polymer/additives mixture (feed mixture) at a point beyond the feed zone where the polymer is melted. If desired, the blowing agent can be injected at other locations, including into a secondary extruder.

Following injection of the blowing agent, the mixture is continuously mixed in the primary extruder 13. The exit pressure of the primary extruder 13 of the exemplary embodiment is generally in the range of from about 1500 to about 4000 psi. The temperature of the primary extruder 13 of the exemplary embodiment is generally in the range of from about 390 to about 475° F. The mixture is subsequently passed, at a high enough pressure that the blowing agent remains in solution, through a hollow adapter section 17 into a cooled secondary tandem extruder 19. The molten mixture is passed along the length of the cooled secondary extruder at low shear where cooling and additional mixing occur. The exit pressure of the secondary extruder 19 of the exemplary embodiment is generally in the range of from about 1000 to about 2500 psi. The temperature of the extrudate from the secondary extruder 19 of the exemplary embodiment is generally in the range of from about 240 to about 320° F. In general, the temperature of the primary extruder should be sufficient to melt the polymer, any organic additives, and to promote efficient mixing. The temperature and pressure in the secondary extruder should be sufficient to maintain a homogeneous solution of the components. It is understood that the temperatures, pressures and other conditions described can vary depending on the properties of the thermoplastic polymer used in the process. The specific conditions to be used are apparent to a person of skill in the art.

The mixture is then expressed through an annular die 21 in the form of an elongated bubble or tube 23. The foamable polymer in FIG. 1 is expanded and drawn over a cylindrical surface of a cooling and sizing drum 25, and slit to form sheet stock 27. The sheet stock 27 is taken up on one or more winding reels 29.

Figure 2:
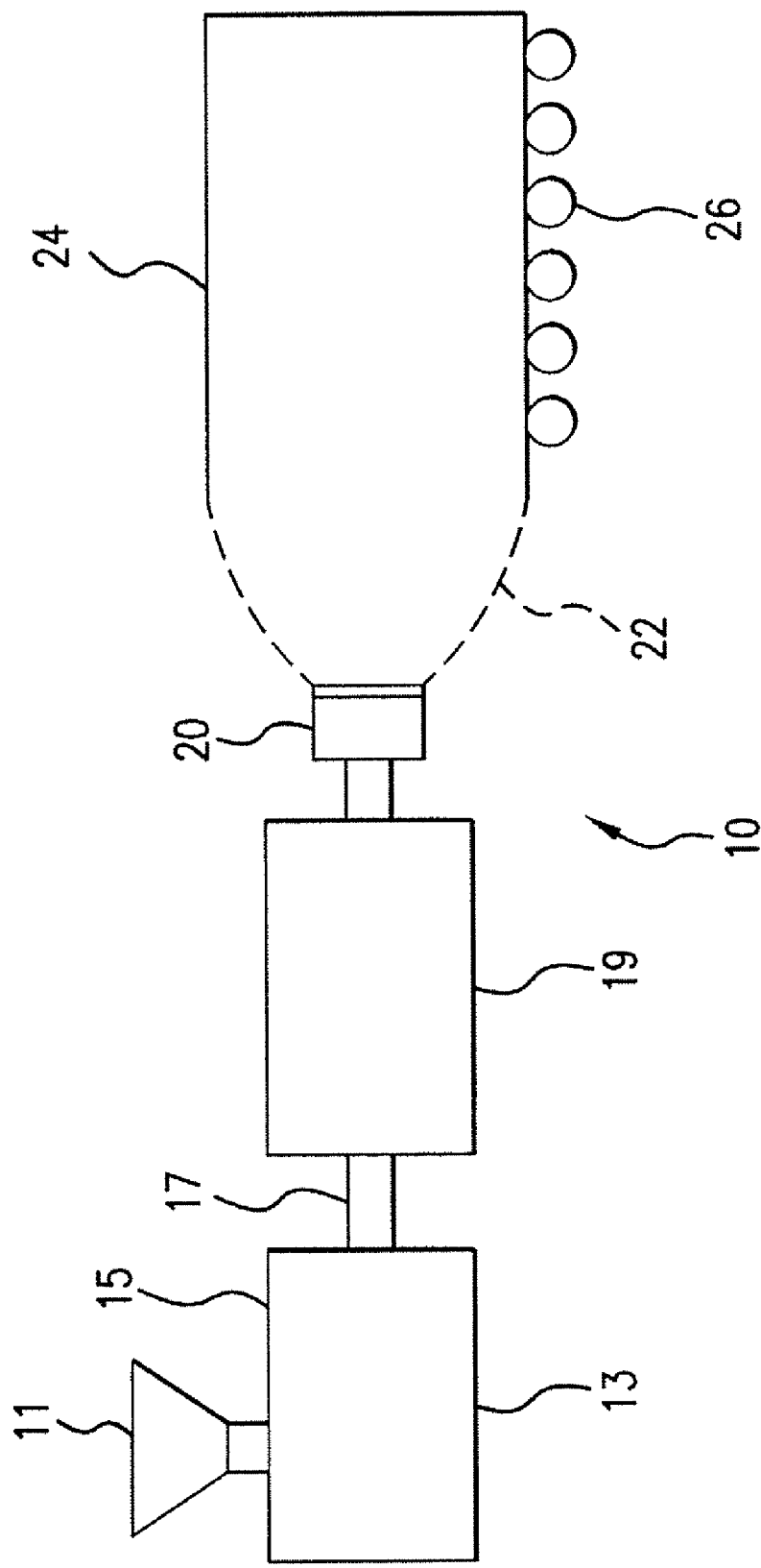
FIG. 2 is a schematic flow diagram of an overall sequence of operations involved in the manufacture of a foam board or plank with the blowing agent blends according to one embodiment of the present invention.

Alternatively, as shown in FIG. 2, the foamable mixture is expressed through a die of a different configuration such as a flat die 20 and allowed to expand in the form of a board or plank 24. The expanding extrudate 22 is moved forward by a set of rollers 26, and may be further directed to a shaping device before emerging as a board or plank 24.

Depending upon the materials and process used, the resulting foam article can be a sheet, a board, a plank, or the like. If the article produced is a sheet, the thickness of the sheet can be up to about 0.5 inch. If the article produced is a plank or a board, the thickness is generally equal to or greater than about 0.5 inch, preferably between 0.5 inch and 3 inches.

For preparation of thermoplastic polymer foam sheets, the use of an annular die is preferred. The articles produced by extrusion through an annular die are generally less than about 0.5 inch in thickness, preferably from about 0.125 to about 0.438 inch in thickness. For preparation of thermoplastic polymer foam boards, e.g. insulation boards, the use of a flat die is preferred. The articles produced by extrusion through a flat die are generally at least about 0.5 inch in thickness. For example, and in a preferred embodiment, for insulating materials, the thickness is about 0.5 to about 3 inches in thickness. Such boards have particular utility as insulating materials, e.g. insulation boards or planks.

Regardless of the type of die used or the foam produced, the extruded foam can be subjected to further expansion or density reduction by application of heat and/or vacuum.

The foam sheets and boards or planks can be used in the extruded form, cut into other shapes, further shaped by application of heat and pressure, or otherwise machined or formed into shaped articles of desired size and shape as known in the art.

Depending upon the materials and process used, the resulting foamed article generally has a density from about 1 to about 15 lb/ft$^3$. A foamed sheet typically has a density from about 2.0 to about 9.0 lb/ft$^3$, while a foamed board used for insulation purposes typically has a density of about 1.5 to about 3.5 lb/ft$^3$. Furthermore, and in accordance with one preferred embodiment of the invention, the resultant foamed article has a substantially closed-cell structure and is defined herein as a foam having greater than about 85% closed cells and, more typically, greater than about 95% closed cells. Alternatively, and in accordance with another aspect of the invention, the resultant foamed article can be formed with 15% or more open cells, for example 20%, 25%, 30% or more open cells. Furthermore, the resulting foam structure can be controlled to comprise at least about 25, 30, 35, 40, 45 or 50 cells per inch for foam sheets, and at least about 50, 55, 65, 75, 85, 95 or 100 cells per inch for insulating boards.

The term "R-value" refers to a unit of thermal resistance used for comparing insulating values of different materials, as is known in the art. Generally, the higher the R-value the better the insulation resists heat transfer. Many factors can affect the R-value of insulation, including the type of blowing agent used and the age of the foam. R-values are usually expressed in terms of a standard unit of thickness of the material. For example, R-values for foams can be measured per inch of foam thickness. Adequate insulating foams such as the foams of the present invention preferably have R-values of about 4.0 per inch or greater. For example, and in a preferred embodiment, the insulating foams of the present invention have R-values per inch of greater than about 5. The R value of the foams of the invention are determined by conventional methods, for example using ASTM C518.

The foams of the present invention can be used for insulation or as building materials, in various containers and packaging systems, or as protective or flexible packaging. Generally speaking, foam sheets are used in flexible as well as rigid packaging, while foam planks are used in protective packaging. Foam boards having a thickness greater than about 0.5 inch are used for insulation applications, for example as building materials. In addition to foam sheets, planks and boards, the present invention can take the form of other shapes such as rods, tubes or contoured members.

Other uses for the foams of the present invention, as well as suitable processes, apparatus, equipment, devices and systems for the preparation thereof are described in U.S. patents and published application U.S. Pat. Nos. 6,136,875, 5,149,473, 6,476,080, 6,599,946, 6,696,504, US 2004/0132844 and US 2004/0006149, the contents of each of which are incorporated by reference herein.

Dimensional stability is usually expressed in terms of % gauge change, which equals 100×(aged gauge−initial gauge)/initial gauge, with initial gauge determined within 15 minutes of extrusion. The resulting foam of the present invention is desirably "dimensionally stable" in that the gauge of the foam after 7 days of aging does not change by more than about 15%, preferably not more than 10%, and more preferably not more than 5% from the gauge of the freshly extruded foam. Preferably, the foams of the invention have a dimensional change of less than about 4%, more preferably less than about 1% in any direction.

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Example A

Various blowing agents were tested with the results shown below in Table 1. Specifically, various alkenyl aromatic polymer foam sheets were made from comparative blowing agents and inventive blowing agents in accordance with the extrusion process generally described herein. It should be noted that for the various examples reported in Table 1, each exemplary foam was made with the same polymer and the same hardware operated in exactly the same way; the only variable being the blowing agent. All of the inventive blowing agents included methyl formate; the comparative blowing agent(s) did not include methyl formate.

Each of the alkenyl aromatic polymer foams was made on a tandem extrusion line employing 2.5 inch and 3.5 inch single screw extruders and blowing agent was injected through a single port in the primary extruder. The polymer resin used was high heat general purpose polystyrene having a density of 1.05 g/cm$^3$ and a melt flow rate of 1.6 g/10 min at 200° C. under a load of 5 kg. In addition to the blowing agents and the polystyrene resin, talc was added in the amount of up to 2 wt % of the total foaming composition including all the blowing agent(s), polymer resin(s), and additives. An annular die was used and the expanding extrudate was directed to a shaping system to form foam sheets. An example of suitable equipment for preparing the alkenyl aromatic polymer foam sheets is described in U.S. Pat. No. 6,136,875, the contents of which are incorporated by reference.

TABLE 1

| Sample | Blowing Agent(s) Used (wt %)[1] | | | | | | | | Talc | Density | Open | Cell Size[4] | % Gauge Change[5] | |
|---|---|---|---|---|---|---|---|---|---|---|---|---|---|---|
| Comp/Inv[2] | Ethane | Propane | Isobutane | n-Butane | Isopentane | CO2 | MF[3] | H$_2$O | wt %[1] | lb/ft$^3$ | Cell % | micron | 1 hour | 7 days |
| Comp 1 | | | | | 5.20 | | | | 1.8 | 5.5 | 1.8 | 200 | 0.8 | 11.1 |
| Comp 2 | | | | | 3.96 | 0.77 | | | 1.0 | 4.7 | 1.0 | 196 | −7.9 | 12.9 |
| Inv 1 | | | | | | | 4.30 | | 1.9 | 8.1 | 2.2 | 187 | −0.3 | 5.6 |
| Inv 2 | | | | | | 0.76 | 3.32 | | 0.5 | 5.6 | 5.6 | 209 | −10.6 | −3.9 |
| Inv 3 | | | | | | 0.50 | 1.95 | 0.50 | 0.7 | 8.6 | 23.5 | 170 | −0.3 | 21.7 |
| Inv 4 | 0.56 | | | | | | 3.52 | | 0.7 | 5.8 | 2.2 | 234 | −1.1 | 4.7 |

TABLE 1-continued

| Sample Comp/Inv[2] | Blowing Agent(s) Used (wt %)[1] | | | | | | | | Talc wt %[1] | Density lb/ft³ | Open Cell % | Cell Size[4] micron | % Gauge Change[5] | |
|---|---|---|---|---|---|---|---|---|---|---|---|---|---|---|
| | Ethane | Propane | Isobutane | n-Butane | Isopentane | CO2 | MF[3] | H₂O | | | | | 1 hour | 7 days |
| Inv 5 | 1.00 | | | | | | 2.40 | | 0.6 | 4.1 | 1.8 | 179 | −0.1 | 7.6 |
| Inv 6 | | 1.22 | | | | 0.55 | 1.97 | | 0.5 | 4.4 | 3.0 | 210 | −6.6 | 9.0 |
| Inv 7 | | 2.01 | | | | 0.37 | 1.21 | | 0.3 | 3.6 | 1.5 | 224 | 0.1 | 15.1 |
| Inv 8 | | 2.67 | | | | 0.34 | 0.34 | | 0.3 | 3.5 | 3.5 | 254 | 0.6 | 9.5 |
| Inv 9 | | | 3.57 | | | 0.35 | 0.27 | | 1.0 | 4.1 | 1.8 | 194 | 0.1 | 11.9 |
| Inv 10 | | | 3.04 | | | 0.35 | 0.74 | | 1.0 | 4.0 | 1.9 | 197 | −0.3 | 13.2 |
| Inv 11 | | | 2.65 | | | 0.31 | 1.17 | | 1.0 | 3.9 | 0.9 | 166 | 0.5 | 13.7 |
| Inv 12 | | | 2.03 | | | 0.37 | 1.82 | | 1.0 | 4.9 | 2.5 | 183 | −3.5 | 22.1 |
| Inv 13 | | | | | | 2.79 | 0.78 | 1.00 | 1.0 | 5.3 | 3.0 | 180 | −5.5 | 10.7 |
| Inv 14 | | | | 2.63 | | | 0.35 | 1.20 | 1.4 | 4.7 | 1.7 | 163 | −7.7 | 18.4 |

[1] wt % = (weight of a component)/(total weight of foaming composition including all the blowing agent(s), polymer resin(s), and additives)
[2] Comp—comparative example; inv—inventive example
[3] MF—methyl formate
[4] The number of cells per inch of the extruded foam ranged from 210 to 420. Cell size (expressed as diameter) was determined from scanning electron microscope image of the extruded sheet that has been aged at least 24 hours and then expanded in the z-direction (along the thickness direction) in a 240° F. oil bath for 2 minutes, while being mechanically constrained in the x and y directions; the number of cells per inch in these further expanded samples ranged from 110 to 210.
[5] % Gauge Change = 100 × (aged gauge − initial gauge)/initial gauge; initial gauge determined within 15 minutes of extrusion All of the above foams of Table 1 were dimensionally stable because after having undergone aging for 7 days no further significant change in the gauge was noticed. It is noted that all of the foams in Table 1, except for inventive example 2, showed post-extrusion growth. This unidirectional change is different from the conventionally used definition of dimensional stability whereby the foam can either shrink or expand with time. The compositions described herein provide stable foam structures produced by an environmentally friendly and cost-effective process. Furthermore, a variety of foams having suitable and desired characteristics can be formed in accordance with the present invention. For example, inventive composition 3 contains the highest percentage of open cells, and is thus advantageous since the flammable properties of the foam are reduced as the percentage of open cells increases due to rapid loss of the flammable component(s) of blowing agent blend. In another example, inventive compositions 2 to 5 include components with the least and negligible impact on air quality. Comparative example 2 is a typical formulation widely used in making polystyrene foam sheet or expanded beads. Other variants of this formulation, again in wide use, are where isopentane is replaced with isobutane or normal butane. Inventive examples 6 to 14 demonstrate how foam sheet (and, by extension, expanded beads) with similar characteristics can be made using formulation where the use of the hydrocarbon VOC blowing agent is much reduced. Furthermore, it should be noted that the total number of moles of the blowing agent in all the formulations in Table 1 is the same (about 0.07 moles per 100 g of total material processed). The attainment of foams with different densities thus simply reflects the effective volatility of the blowing agent blend. It will be obvious to one skilled in the art that foams with lower densities can be obtained by changing the blend composition and making it rich in the component(s) with higher volatility, and that the density can be further reduced by using more number of moles of the blowing agent. Each of the inventive compositions of Table 1 gives rise to a foam that is stable and easy to manufacture and handle.

Example B

Various blowing agents for use in forming insulating foam planks or boards were tested with the results shown below in Table 2. Specifically, various alkenyl aromatic polymer foam boards useful for insulation applications were made from inventive blowing agent blends in accordance with the extrusion process generally described herein. It should be noted that for the various examples reported in Table 2, each exemplary foam board was made with the same hardware operated in exactly the same way; the only variable being the composition of the blowing agent blend and the relative percentages of the polystyrene polymer. All of the inventive blowing agent blends include methyl formate in combination with the co-blowing agent HFC-134a.

Each of the alkenyl aromatic polymer foams was made on a tandem extrusion line employing 1.0" and 1.5" single-screw extruders equipped with three ports in the primary extruder for injecting compressed fluids. The output rate was 10 lb/hr. The polymer samples used were high heat general purpose polystyrene having a melt flow rate of 1.6 (PS1), high heat general purpose polystyrene having a melt flow rate of 11 (PS2), and polystyrene reclaimed from Applicant's commercial insulation board process having a melt flow rate of 11.5 (PS3). Talc was added in the amount up to about 2.5% of the amount of virgin polystyrene (PS1+PS2). A flat die was used and the expanding extrudate was directed to a shaping system to form foam boards with nominal dimensions of 5.0"(width)×0.5"(thickness). The shaping device used tended to create a preferential orientation of the cells in the normal direction, as seen in Table 2.

Table 2 provides various exemplary compositions used to prepare insulating foam boards from an extrudate comprising polystyrene, talc, methyl formate, HFC-134a and optionally $CO_2$, in accordance with the present invention. Additionally, Table 2 provides the melt temperature of each of the foaming compositions prior to extrusion. Table 2 also provides the density, R-value, and cell size of the corresponding board or plank formed from the various exemplary compositions.

TABLE 2

| | Inventive Example | | | | | | | |
|---|---|---|---|---|---|---|---|---|
| | 1 | 2 | 3 | 4 | 5 | 6 | 7 | 8 |
| PS1 (wt %)[1] | 99.00 | 66.00 | 66.00 | 66.00 | 66.00 | 66.00 | 66.00 | 50.00 |
| PS2 (wt %)[1] | 0.00 | 32.35 | 0.00 | 0.00 | 0.00 | 0.00 | 0.00 | 0.00 |
| PS3 (wt %)[1] | 0.00 | 0.00 | 32.35 | 32.35 | 32.68 | 32.68 | 32.68 | 50.00 |
| Talc (wt %)[1] | 1.00 | 1.65 | 1.65 | 1.65 | 1.32 | 1.32 | 1.32 | 0.00 |
| Methyl Formate (pph)[2] | 2.42 | 2.61 | 3.42 | 4.72 | 4.07 | 4.24 | 3.95 | 3.73 |
| HFC-134a (pph)[2] | 2.01 | 2.73 | 5.17 | 4.72 | 3.99 | 5.50 | 6.17 | 5.83 |
| $CO_2$ (pph)[2] | 0.00 | 0.00 | 0.00 | 0.00 | 0.36 | 0.00 | 0.00 | 0.00 |
| Melt temp (° C.)[3] | 149 | 141 | 131 | 121 | 122 | 121 | 120 | 121 |
| Fresh Density (pcf)[4,5] | 3.88 | 3.15 | 2.70 | 2.52 | 2.67 | 2.67 | 2.86 | 2.70 |
| Fresh R-Value (/inch)[4,6] | 5.31 | 5.80 | 5.82 | 6.11 | 5.82 | 6.02 | 6.15 | 6.10 |
| 7-day R-value (/inch)[6] | 4.36 | 4.63 | 4.64 | 4.78 | 4.65 | 4.84 | 5.01 | 4.94 |
| Cell size, MD (mm)[7,8] | 0.222 | 0.181 | 0.221 | 0.246 | 0.223 | 0.212 | 0.192 | 0.236 |
| Cell size, TD (mm)[7,8] | 0.245 | 0.224 | 0.234 | 0.223 | 0.229 | 0.197 | 0.267 | 0.285 |
| Cell size, ND (mm)[7,8] | 0.274 | 0.221 | 0.258 | 0.259 | 0.253 | 0.217 | 0.245 | 0.250 |

[1] wt % = weight of component/weight of (PS1 + PS2 + PS3 + talc)
[2] pph = parts blowing agent component per hundred parts of (PS1 + PS2 + PS3 + talc)
[3] The temperature just before the foaming formulation enters the die
[4] Fresh measurements made within 15 minutes of extrusion
[5] Determined by measuring dimensions and mass of a nominal 4" × 15" × 0.5" sample
[6] R is in $ft^2 \cdot hr \cdot °F/Btu$. Thermal resistivity determined using ASTM C518
[7] Cell size determined using ASTM D3576
[8] MD, TD, and ND—machine, transverse, and normal direction, respectively All of the foam boards of Table 2 were dimensionally stable. The dimensions were measured within 15 minutes of extrusion and then after 14 and 28 days. The change in any given dimension was less than 1% and the overall change in density with respect to the fresh density was within 2%.

In accordance with another aspect of the present invention, and in addition to the benefits of using methyl formate as a blowing agent previously set forth, such as offsetting the harmful environmental impacts associated with blowing agents in current use, the use of methyl formate provides an additional advantage. Namely, methyl formate escapes the foam quite rapidly. About 12% of the methyl formate escaped the 0.5Δ thick board within the first 3 hours following extrusion, and none was detected after 30 days using a limit of detection of 500 ppm. Because methyl formate is the only flammable component of the blowing agent mixture, no flame retardant is necessary in the formulation. Ethane can be substituted for $CO_2$. Although ethane is flammable, it also escapes the foam matrix rapidly, again not requiring the use of flame retardant.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A process for making an alkenyl aromatic polymer foam board comprising:
   melting a thermoplastic alkenyl aromatic polymer;
   dissolving an effective amount of a blowing agent blend in the alkenyl aromatic polymer to define a mixture, the blowing agent blend comprising greater than about 39 weight percent of methyl formate;
   forming an extrudate from the mixture; and
   expanding the extrudate to produce the alkenyl aromatic polymer foam board, wherein the alkenyl aromatic polymer foam board has a thickness of at least 0.5 inch and an R value of about 4 per inch or greater.

2. The process of claim 1, wherein the blowing agent blend further includes at least one co-blowing agent selected from the group consisting of propane, butane, and pentane, or an isomer thereof.

3. The process of claim 1, wherein the blowing agent blend further includes carbon dioxide or water.

4. The process of claim 1, wherein the blowing agent blend further includes a chemical blowing agent.

5. The process of claim 1, wherein the average cell size of the alkenyl aromatic polymer foam board is about 160 to about 285 microns.

6. The process of claim 1, wherein the extrudate comprises from about 1 to about 18 weight percent blowing agent.

7. The process of claim 6, wherein the extrudate comprises from about 4 to about 10 weight percent blowing agent.

8. The process of claim 1, wherein the alkenyl aromatic polymer foam board has a density of about 1.5 to about 3.9 $lb/ft^3$.

9. The process of claim 1, wherein the alkenyl aromatic polymer is polystyrene.

10. A process for making an alkenyl aromatic polymer foam board comprising:
    melting a thermoplastic alkenyl aromatic polymer;
    dissolving an effective amount of a blowing agent blend in the alkenyl aromatic polymer to define a mixture, the blowing agent blend consisting of about 5 to about 85 weight percent of methyl formate and about 15 to about 95 weight percent of at least one co-blowing agent selected from the group consisting of $C_2$ to $C_5$ hydrocarbon, carbon dioxide and water;
    forming an extrudate from the mixture; and
    expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

11. The process of claim 10, wherein the average cell size of the alkenyl aromatic polymer foam board is about 160 to about 285 microns.

12. The process of claim 10, wherein the extrudate comprises from about 1 to about 18 weight percent blowing agent.

13. The process of claim 12, wherein the extrudate comprises from about 4 to about 10 weight percent blowing agent.

14. The process of claim 10, wherein the alkenyl aromatic polymer foam board has a density of about 1.5 to about 3.9 lb/ft$^3$.

15. The process of claim 10, further comprising adding at least one additive selected from the group consisting of fillers, colorants, light and heat stabilizers, anti-oxidants, acid scavengers and stability control agents to the polymer.

16. The process of claim 10, further comprising mixing a nucleating agent with the alkenyl aromatic polymer prior to the extrudate forming step.

17. A process for making an alkenyl aromatic polymer foam board comprising:
melting a thermoplastic alkenyl aromatic polymer;
dissolving an effective amount of a blowing agent blend in the alkenyl aromatic polymer to define a mixture, the blowing agent blend consisting essentially of methyl formate and ethane;
forming an extrudate from the mixture; and
expanding the extrudate to produce the alkenyl aromatic polymer foam board, the alkenyl aromatic polymer foam board having a thickness of at least 0.5 inch and an R value of about 4 per inch or greater, wherein the blowing agent blend is the sole blowing agent in the polymer.

18. The process of claim 17, wherein the blowing agent blend consists of methyl formate and ethane.

19. The process of claim 17, wherein the alkenyl aromatic polymer foam board has a density of about 1.5 to about 3.9 lb/ft$^3$.

20. The process of claim 17, wherein the extrudate comprises from about 1 to about 18 weight percent blowing agent.

21. The process of claim 20, wherein the extrudate comprises from about 4 to about 10 weight percent blowing agent.

22. The process of claim 17, wherein the average cell size of the alkenyl aromatic polymer foam board is about 160 to about 285 microns.

23. The process of claim 17, wherein the process further comprises mixing a nucleating agent with the alkenyl aromatic polymer prior to the extrudate forming step.

24. The process of claim 17 wherein the alkenyl aromatic polymer foam board is a substantially closed-cell structure.

25. The process of claim 17, wherein the alkenyl aromatic polymer foam board is dimensionally stable.

26. The process of claim 17, further comprising adding at least one additive selected from the group consisting of fillers, colorants, light and heat stabilizers, anti-oxidants, acid scavengers and stability control agents to the polymer.

27. A process for making an alkenyl aromatic polymer foam board comprising:
melting a thermoplastic alkenyl aromatic polymer;
dissolving an effective amount of a blowing agent blend in the alkenyl aromatic polymer to define a mixture, the blowing agent blend consisting of methyl formate and 1,1,1,2-tetrafluoroethane (HFC-134a);
forming an extrudate from the mixture; and
expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

28. The process of claim 27, the blowing agent blend consisting of about 40 to about 55 percent by weight methyl formate and 45 to 60 percent by weight 1,1,1,2-tetrafluoroethane (HFC-134a).

29. The process of claim 26, wherein the average cell size of the alkenyl aromatic polymer foam board is about 180 to about 285 microns.

30. The process of claim 26, wherein the extrudate comprises from about 1 to about 18 weight percent blowing agent.

31. The process of claim 30, wherein the extrudate comprises about 4 to about 10 weight percent blowing agent.

32. The process of claim 26, wherein the alkenyl aromatic polymer foam board has a density of about 2.5 to about 3.9 lb/ft$^3$.

33. The process of claim 27, further comprising adding at least one additive selected from the group consisting of fillers, colorants, light and heat stabilizers, anti-oxidants, acid scavengers and stability control agents to the polymer.

34. The process of claim 27, further comprising mixing a nucleating agent with the alkenyl aromatic polymer prior to the extrudate forming step.

35. A process for making an alkenyl aromatic polymer foam board comprising:
melting a thermoplastic alkenyl aromatic polymer;
dissolving an effective amount of a blowing agent blend in the alkenyl aromatic polymer to define a mixture, the blowing agent blend consisting of methyl formate and 1,1,1,2-tetrafluoroethane (HFC-134a) and carbon dioxide;
forming an extrudate from the mixture; and
expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

36. The process of claim 35, the blowing agent blend consisting of about 40 to about 55 percent by weight methyl formate, of about 45 to about 60 percent by weight 1,1,1,2-tetrafluoroethane (HFC-134a) and of about 0 to about 4 percent by weight carbon dioxide.

37. The process of claim 35, wherein the alkenyl aromatic polymer foam board has a density of about 2.5 to about 3.9 lb/ft$^3$.

38. The process of claim 35, wherein the extrudate comprises from about 1 to about 18 weight percent blowing agent.

39. The process of claim 38, wherein the extrudate comprises from about 4 to about 10 weight percent blowing agent.

40. The process of claim 35, further comprising adding at least one additive selected from the group consisting of fillers, colorants, light and heat stabilizers, anti-oxidants, acid scavengers and stability control agents to the polymer.

41. The process of claim 35, further comprising mixing a nucleating agent with the alkenyl aromatic polymer prior to the extrudate forming step.

42. An alkenyl aromatic polymer foam board prepared by a process comprising:
melting a thermoplastic alkenyl aromatic polymer;
dissolving an effective amount of a blowing agent blend in the alkenyl aromatic polymer to define a mixture, the blowing agent blend comprising greater than about 39 weight percent of methyl formate; and forming an extrudate from the mixture; and expanding the extrudate to produce the alkenyl aromatic polymer foam board, wherein the alkenyl aromatic polymer foam board has a thickness of at least 0.5 inch and an R value of 4 per inch or greater.

43. The alkenyl aromatic polymer foam board of claim 42, wherein the blowing agent blend includes a chemical blowing agent.

44. The alkenyl aromatic polymer foam board of claim 42, wherein the blowing agent blend further comprises at least one co-blowing agent selected from the group consisting of propane, butane, and pentane, or an isomer thereof.

45. The alkenyl aromatic polymer foam board of claim 42, wherein the blowing agent blend further includes carbon dioxide or water.

46. The alkenyl aromatic polymer foam board of claim 42, wherein the extrudate comprises from about 1 to about 18 weight percent blowing agent.

47. The alkenyl aromatic polymer foam board of claim 46, wherein the extrudate comprises from about 4 to about 10 weight percent blowing agent.

48. The alkenyl aromatic polymer foam board of claim 42, further comprising mixing a nucleating agent with the thermoplastic alkenyl aromatic polymer prior to the extrudate forming step.

49. The alkenyl aromatic polymer foam board of claim 42, wherein the alkenyl aromatic polymer foam board is a substantially closed-cell structure.

50. The alkenyl aromatic polymer foam board of claim 42, wherein the alkenyl aromatic polymer foam board is dimensionally stable.

51. The alkenyl aromatic polymer foam board of claim 42, wherein the alkenyl aromatic polymer foam board has a density of about 1.5 to about 3.9 lb/ft$^3$.

52. An alkenyl aromatic polymer foam board prepared by a process comprising:

melting a thermoplastic alkenyl aromatic polymer;

dissolving an effective amount of a blowing agent blend in the alkenyl aromatic polymer to define a mixture, the blowing agent blend consisting of methyl formate, 1,1,1,2-tetrafluoroethane (HFC-134a) and optionally carbon dioxide;

forming an extrudate from the mixture; and expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

53. The alkenyl aromatic polymer foam board of claim 52, the blowing agent blend consisting of about 40 to about 55 percent by weight methyl formate, of about 45 to about 60 percent by weight 1,1,1,2-tetrafluoroethane (HFC-134a) and of about 0 to about 4 percent by weight carbon dioxide.

54. The alkenyl aromatic polymer foam board of claim 52, wherein the alkenyl aromatic polymer foam board has a density of about 2.5 to about 3.9 lb/ft$^3$.

55. The alkenyl aromatic polymer foam board of claim 52, wherein the average cell size of the alkenyl aromatic polymer foam board is about 160 to about 285 microns.

56. The alkenyl aromatic polymer foam board of claim 52, wherein the extrudate comprises from about 1 to about 18 weight percent blowing agent.

57. The alkenyl aromatic polymer foam board of claim 56, wherein the extrudate comprises from about 4 to about 10 weight percent blowing agent.

58. The alkenyl aromatic polymer foam board of claim 52, wherein the alkenyl aromatic polymer foam board is dimensionally stable.

59. A process for making an alkenyl aromatic polymer foam board comprising:

melting a thermoplastic alkenyl aromatic polymer;

dissolving an effective amount of a blowing agent blend in the alkenyl aromatic polymer to define a mixture, the blowing agent blend consisting of methyl formate and carbon dioxide, and optionally water;

forming an extrudate from the mixture; and expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

60. The alkenyl aromatic polymer foam board of claim 52, further comprising mixing a nucleating agent with the alkenyl aromatic polymer prior to the extrudate forming step.

61. A process for making an alkenyl aromatic polymer foam board comprising:

melting a thermoplastic alkenyl aromatic polymer;

dissolving an effective amount of a blowing agent blend in the alkenyl aromatic polymer to define a mixture, the blowing agent blend consisting of methyl formate and carbon dioxide, and optionally water;

forming an extrudate from the mixture; and expanding the extrudate to produce the alkenyl aromatic polymer foam board, wherein the alkenyl aromatic polymer foam board has a thickness of at least 0.5 inch and an R value of about 4 per inch or greater, and wherein the blowing agent blend is the sole blowing agent in the polymer.

62. The process of claim 61, wherein the average cell size of the alkenyl aromatic polymer foam board is about 160 to about 285 microns.

63. The process of claim 61, wherein the extrudate comprises from about 1 to about 18 weight percent blowing agent.

64. The process of claim 61, wherein the alkenyl aromatic polymer is polystyrene.

65. The process of claim 61, wherein the alkenyl aromatic polymer foam board is dimensionally stable.

* * * * *

UNITED STATES PATENT AND TRADEMARK OFFICE
CERTIFICATE OF CORRECTION

| | | |
|---|---|---|
| PATENT NO. | : 7,312,253 B2 | Page 1 of 1 |
| APPLICATION NO. | : 11/016312 | |
| DATED | : December 25, 2007 | |
| INVENTOR(S) | : Handa et al. | |

It is certified that error appears in the above-identified patent and that said Letters Patent is hereby corrected as shown below:

ON THE TITLE PAGE:

Item (56), References Cited, insert under "U.S. Patent Documents":

-- 6,476,080 A    Duffy et al.    11/2002 --

At column 16, line 9: "claim 26" should read -- claim 27 --

At column 16, line 12: "claim 26" should read -- claim 27 --

At column 16, line 17: "claim 26" should read -- claim 27 --

At column 18, line 13, cancel the text beginning with "59. A process for making" and ending at "in the polymer." at line 26 and insert the following claim:

-- 59. The alkenyl aromatic polymer foam board of claim 52, further comprising adding at least one additive selected from the group consisting of fillers, colorants, light and heat stabilizers, anti-oxidants, acid scavengers and stability control agents to the polymer. --

Signed and Sealed this

Sixth Day of May, 2008

JON W. DUDAS
*Director of the United States Patent and Trademark Office*